(12) United States Patent
Kasztelan

(10) Patent No.: US 6,432,867 B1
(45) Date of Patent: *Aug. 13, 2002

(54) PROCESS FOR SULFURIZING CATALYSTS IN A REDUCING MEDIUM

(75) Inventor: Slavik Kasztelan, Rueil Malmaison (FR)

(73) Assignee: Insitut Francais du Petrole, Rueil-Malmaison Cedex (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/344,351

(22) Filed: Jun. 25, 1999

(30) Foreign Application Priority Data

Jun. 25, 1998 (FR) ............................................. 98 08048

(51) Int. Cl.$^7$ ......................... B01J 27/02; B01J 27/043
(52) U.S. Cl. ................. 502/216; 502/202; 502/203; 502/204; 502/206; 502/207; 502/208; 502/209; 502/210; 502/211; 502/217
(58) Field of Search ................. 502/216, 217, 502/208, 209, 210, 211, 202, 203, 204, 206, 207

(56) References Cited

U.S. PATENT DOCUMENTS

| | | | |
|---|---|---|---|
| 3,592,760 A | 7/1971 | Young | 208/111 |
| 3,677,970 A | 7/1972 | Mertzweiller et al. | 252/431 |
| 3,997,431 A | 12/1976 | Beuther et al. | 208/216 |
| 4,007,135 A | 2/1977 | Hayden et al. | 502/317 |
| 4,102,822 A | 7/1978 | Mulaskey | 502/216 |
| 4,105,587 A | 8/1978 | Blakely | 502/216 |
| 4,105,589 A | 8/1978 | Moser | 502/216 |
| 4,108,761 A | 8/1978 | Sze et al. | 208/254 H |
| 4,171,258 A | 10/1979 | Gaspar | 208/144 |
| 4,181,602 A | 1/1980 | Quick et al. | 208/216 PP |
| 4,320,030 A | 3/1982 | Happel et al. | 518/714 |
| 4,326,991 A * | 4/1982 | Asaoka et al. | 502/216 |
| 4,491,639 A | 1/1985 | Happel et al. | 502/219 |
| 4,530,917 A | 7/1985 | Berrebi | 502/216 |
| 4,560,804 A | 12/1985 | Yeh et al. | 568/408 |
| 4,595,672 A | 6/1986 | Ho et al. | 502/219 |
| 4,687,568 A | 8/1987 | Kukes et al. | 208/251 |
| 4,740,491 A | 4/1988 | Wise et al. | 502/216 |
| 4,824,820 A | 4/1989 | Jacobson et al. | 502/219 |
| 4,945,078 A | 7/1990 | Erekson et al. | 502/202 |
| 4,994,498 A | 2/1991 | Kinkade | 518/714 |
| 5,122,258 A | 6/1992 | Eadie et al. | 208/112 |
| 5,173,468 A | 12/1992 | Boehning et al. | 502/209 |
| 5,525,740 A | 6/1996 | Rizkalla | 549/534 |
| 5,629,257 A | 5/1997 | Umansky et al. | 502/216 |
| 5,688,736 A | 11/1997 | Seamans et al. | 502/219 |
| 5,736,483 A | 4/1998 | Rizkalla et al. | 502/347 |
| 5,854,167 A | 12/1998 | Rizkalla et al. | 502/216 |
| 5,905,053 A | 5/1999 | Rizkalla et al. | 502/216 |
| 6,071,402 A * | 6/2000 | Danot et al. | 208/112 |

FOREIGN PATENT DOCUMENTS

| | | |
|---|---|---|
| EP | 0 130 850 | 1/1985 |
| EP | 0 181 082 | 5/1986 |
| EP | 0 216 472 | 4/1987 |
| EP | 0 448 435 | 9/1991 |
| EP | 0 466 568 | 1/1992 |
| EP | 0 582 403 | 2/1994 |
| EP | 0 707 890 | 4/1996 |
| FR | 2 668 951 | 5/1992 |
| GB | 2 036 582 | 7/1980 |
| WO | 92/00141 | 1/1992 |

* cited by examiner

*Primary Examiner*—Elizabeth D. Wood
(74) *Attorney, Agent, or Firm*—Millen, White, Zelano & Branigan, P.C.

(57) ABSTRACT

Sulfided catalysts produced by sulfurizing supported catalysts containing at least one element selected from group IIIB, including the lanthanides and actinides, group IVB and group VB, wherein the catalyst is brought into contact with at least one source of elemental sulfur e.g. flowers of sulfur in an atmosphere of at least one reducing gas other than hydrogen e.g. carbon monoxide. The catalyst is suitable for converting hydrocarbon-containing feeds, such as hydrocracking and hydrotreatment.

25 Claims, No Drawings

US 6,432,867 B1

PROCESS FOR SULFURIZING CATALYSTS IN A REDUCING MEDIUM

FIELD OF THE INVENTION

The present invention relates to a process for sulphurising supported catalysts containing at least one element selected from group IIIB, including the lanthanides and actinides, group IVB, group VB (groups 3, 4, 5 in the new notation for the periodic table: "Handbook of Chemistry and Physics, 76$^{th}$ edition, 1995–1996, inside front. cover), at least one porous matrix, generally an amorphous or low crystallinity oxide type matrix, optionally at least one zeolitic or non zeolitic molecular sieve, optionally at least one element selected from groups VIB and VIII (groups 6, 8, 9, 10 in the new notation for the periodic table), optionally at least one element selected from the group formed by P, B, Si, and optionally at least one element from group VIIA (group 17). The process for preparing the sulphurised catalyst is characterized in that the catalyst is sulphurised by at least one compound containing elemental sulphur in an atmosphere of at least one reducing gas other than hydrogen.

The present invention also relates to the catalysts obtained using the process of the present invention.

The present invention also relates to any reaction for hydrorefining and hydroconverting the sulphide catalysts obtained as catalysts for hydrogenation, hydrodenitrogenation, hydrodeoxygenation, hydrodearomatisation, hydrodesulphurisation, hydrodemetallisation and hydrocracking of hydrocarbon-containing feeds containing at least one aromatic and/or olefinic and/or naphthenic and/or paraffinic type compound, said feeds possibly containing metals and/or nitrogen and/or oxygen and/or sulphur.

The sulphides can be synthesised by a number of methods which are well known to the skilled person.

BACKGROUND OF THE INVENTION

Crystallised transition metal or rare earth sulphides can be synthesised by reacting transition metal or rare earth type elements with elemental sulphur at high temperature in a process which is well known to the skilled person in the solid state chemistry field but is expensive, in particular as regards industrial application.

The synthesis of bulk or supported sulphides by reacting a suitable precursor in the form of a mixed oxide of transition metals or rare earth metals with a sulphur compound in a gas phase such as hydrogen sulphide or carbon disulphide, $CS_2$, or mercaptans, sulphides, disulphides, hydrocarbon-containing polysulphides, sulphur vapour, COS, carbon disulphide, in a traversed bed reactor, is well known to the skilled person.

The synthesis of sulphides by reacting a suitable precursor in the form of a mixed oxide of transition metals and/or rare earths impregnated with a sulphur compound in the liquid phase followed by treatment in hydrogen in a traversed bed reactor is well known to the skilled person.

The synthesis of bulk sulphide catalysts or sulphide catalysts supported on a porous matrix by treatment of a bulk oxide precursor or an oxide precursor supported on a porous matrix in hydrogen with a sulphur-containing hydrocarbon feed, in particular sulphur-containing petroleum cuts such as gasoline, kerosene, gas oil, to which a sulphur compound, for example dimethyldisulphide, can optionally be added, is also well known to the skilled person.

Bulk sulphides can also be synthesised by co-precipitation, in a basic medium, of sulphur-containing complexes in solution containing two cations. This method can be carried out at a controlled pH and is termed homogeneous sulphide precipitation. It has been used to prepare a mixed sulphide of cobalt and molybdenum (G. Hagenbach, P. Courty, B. Delmon, Journal of Catalysis, volume 31, page 264, 1973).

Synthesising bulk mixed sulphides on a porous matrix by treatment of a bulk oxide precursor or an oxide precursor supported on a porous matrix in a hydrogen/hydrogen sulphide mixture or nitrogen/hydrogen sulphide mixture is also well known to the skilled person.

U.S. Pat. No. 4,491,639 describes the preparation of a sulphur-containing compound by reacting elemental sulphur with V, Mo, W salts and in particular V, Mo and W sulphides optionally containing at least one of elements from the series C, Si, B, Ce, Th, Nb, Zr, Ta, U in combination with Co or Ni.

Other methods have been proposed for the synthesis of simple sulphides. As an example, the synthesis of crystallised simple sulphides of rare earths described in U.S. Pat No. 3,748,095 and French patent FR-A-2 100 551 proceeds by reacting hydrogen sulphide or carbon disulphide with an amorphous rare earth oxide or oxycarbonate at a temperature of over 1000° C.

European patents EP-A-0 440 516 and U.S. Pat No. 5,279,801 describe a process for synthesising simple transition metal or rare earth sulphur-containing compounds by reacting a transition metal or rare earth compound with a carbon-containing sulphur compound in the gaseous state. in a closed vessel at a moderate temperature of 350° C. to 600° C.

However, it is well known that certain elements such as group IIIB elements, including the lanthanides and actinides, group IVB elements, and group VB elements, are very difficult to sulphurise. The known sulphurisation methods which are routinely used industrially and in the laboratory, such as sulphurisation in a gaseous hydrogen/hydrogen sulphide mixture or liquid phase sulphurisation under hydrogen pressure using a mixture of a hydrocarbon feed and a sulphur-containing compound such as dimethyldisulphide, are thus ineffective when sulphurising such solids.

SUMMARY OF THE INVENTION

The considerable amount of research carried out by the Applicant on preparing sulphide catalysts based on sulphides of elements from groups IIIB, IVB , VB and numerous other elements of the periodic table, used alone or as mixtures, associated with a matrix, have led to the discovery that, surprisingly, by reacting elemental sulphur with a powder containing at least one element selected from group IIIB, including the lanthanides and actinides, group IVB, group VB, possibly at least one element from group VIB and possibly at least one element from group VIII, in a closed or open vessel in an atmosphere of a reducing gas other than hydrogen, produces an amorphous or crystalline sulphide compound. Without wishing to be bound by any particular theory, it appears that sulphurisation is obtained by reducing a precursor compound containing the element or elements selected from group IIIB, including the lanthanides and actinides, group IVB, group VB, optionally at least one group VIB element and optionally at least one group VIII element, with the reducing gas with simultaneous sulphurisation of the reduced element by the sulphur until the precursor containing the element or elements selected from group IIIB, including the lanthanides and actinides, group IVB, group VB, and optionally at least one group VIII element, is exhausted.

The invention relates to preparing sulphurised catalysts, characterized in that the catalyst is sulphurised by a compound containing elemental sulphur in an atmosphere of at least one reducing gas other than hydrogen.

More precisely, a process for producing the sulphide catalysts of the present invention consists in:

a) forming a reaction mixture which comprises: a powder or mixture of powders containing at least one element selected from group IIIB, including the lanthanides and actinides, group IVB and group VB, at least one porous matrix which is generally an amorphous or low crystallinity oxide type matrix, optionally at least one zeolitic or non zeolitic molecular sieve, optionally at least one group VIB element, optionally at least one group VIII element, optionally at least one source of an element selected from the group formed by P, B and Si, optionally at least one source of anions from group VIIA, at least one source of elemental sulphur, optionally a source of carbon, and optionally water;

b) maintaining the reaction mixture obtained after step a) at a heating temperature of more than 40° C. at a pressure of over 0.01 MPa of at least one reducing gas other than hydrogen in a reactor.

The reactor may be a closed reactor. In this case, it may be charged in the open air and after sealing, it may be purged with an inert gas such as argon or helium and the reducing gas is introduced. After reaction, the pressure exerted is the pressure due to the gases produced by the reactions and to the residual reducing gas.

The reactor can optionally be a traversed bed reactor, such as a fixed bed, moving bed, ebullated bed, or fluidised bed reactor. In this case the pressure exerted is that of the reducing gas.

Catalyst sulphurisation can also be carried out ex-situ, for example outside the location where the catalyst is used.

The sulphur source is elemental sulphur in its different forms, for example flowers of sulphur, sulphur suspended in an aqueous medium or sulphur suspended in an organic medium.

The reaction is carried out in an atmosphere of at least one reducing gas other than hydrogen. The reducing gas can be one of the following: carbon monoxide, carbon dioxide $CO_2$, nitric oxide, $N_2O$, $NO_2$, methane, ethane, propane, butane, or ammonia. These gases can be used alone or as a mixture. These gases can optionally be diluted by an inert gas such as nitrogen, a rare gas such as helium, neon, argon, krypton, xenon or radon, superheated steam or a combination of at least two of these compounds.

The present invention also relates to the catalysts obtained using the above process, generally comprising at least one metal selected from the following groups and in the following amounts, generally in % by weight with respect to the total catalyst mass:

0.01% to 40%, preferably 0.01% to 35%, more preferably 0.01% to 30%, of at least one metal selected from elements from groups IIIB, IVB and VB;

0.1% to 99%, preferably 1% to 98%, of at least one support selected from the group formed by amorphous matrices and low crystallinity matrices;

0.001% to 30%, preferably 0.01% to 55%, of sulphur;

0 to 30%, preferably 0.01% to 25%, of at least one metal selected from group VIB and group VIII metals;

and optionally 0 to 90%, preferably 0.1% to 85%, more preferably 0.1% to 80%, of a zeolitic or non zeolitic molecular sieve;

0 to 40%, preferably 0.1% to 30%, more preferably 0.1% to 20%, of at least one element selected from the group formed by boron, silicon and phosphorous;

0 to 20%, preferably 0.1% to 15%, more preferably 0.1% to 10%, of at least one element selected from group VIIA.

The group VB elements are selected from vanadium, niobium and thallium; the group IVB elements are selected from titanium, zirconium and hafnium, preferably titanium. The group IIIB elements are selected from yttrium, lanthanum, cerium, praseodymium, neodymium, samarium, europium, gadolinium, terbium, dysprosium, holmium, erbium, thulium, ytterbium, lutetium, actinium, thorium and uranium. The group VIII elements are selected from iron, cobalt, nickel, ruthenium, rhodium, palladium, osmium, iridium and platinum, preferably iron, cobalt and nickel. The group VIB elements are selected from chromium, molybdenum and tungsten.

Compounds containing at least one element with an atomic number included in the group constituted by elements from group IIIB including the lanthanides and actinides, group IVB and group VB, and optional groups VIB and VIII, include oxides, hydroxides, oxyhydroxides, acids, polyoxometallates, alkoxides, oxalates, ammonium salts, nitrates, carbonates, hydroxycarbonates, carboxylates, halides, oxyhalides, phosphates, and thiosalts, in particular of ammonium. Preferably, oxides and salts of transition metals, lanthanides and actinides are used.

The preferred phosphorous source is orthophosphoric acid $H_3PO_4$, but its salts and esters such as alkaline phosphates and ammonium phosphates are also suitable. Phosphorous can, for example, be introduced in the form of a mixture of phosphoric acid and a basic organic compound containing nitrogen such as ammonia, primary and secondary amines, cyclic amines, compounds of the pyridine family and quinolines and compounds from the pyrrole family.

A number of silicon sources can be used. Thus the following can be used: a hydrogel, an aerogel or a colloidal suspension of an oxide of silicon, precipitation oxides, oxides from the hydrolysis of esters such as ethyl orthosilicate $Si(OEt)_4$, silanes and polysilanes, siloxanes, polysiloxanes, silicates of halides such as ammonium fluorosilicate $(NH_4)_2SiF_6$ or sodium fluorosilicate $Na_2SiF_6$. Silicon can be added, for example, by impregnating with ethyl silicate in solution in an alcohol.

The boron source can be an amorphous borate such as ammonium biborate or ammonium pentaborate. Boron can, for example, be introduced in the form of a solution of boric acid in an alcohol.

Sources of group VIIA elements which can be used are well known to the skilled person. As an example, fluoride ions can be introduced in the form of hydrofluoric acid or its salts. These salts are formed with alkaline metals, ammonium salts or salts of an organic compound. In the latter case, the salt is advantageously formed in the reaction mixture by reaction between the organic compound and hydrofluoric acid. Hydrolysable compounds which can liberate fluoride ions in water can also be used, such as ammonium fluorosilicate $(NH_4)_2SiF_6$, silicon tetrafluoride $SiF_4$ or sodium fluorosilicate $Na_2SiF_6$. Fluorine can be introduced, for example, by impregnating with an aqueous solution of hydrofluoric acid or ammonium fluoride.

The chloride anions can be introduced in the form of hydrochloric acid or its salts. These salts are formed with alkali metals, ammonium or an organic compound. In the latter case, the salt is advantageously formed in the reaction mixture by reaction between the organic compound and hydrochloric acid.

All of the forms of the carbon source which are known to the skilled person can be used, for example graphite, oil coke, coal coke, amorphous carbon, carbon black, charcoals obtained by partial combustion or by decomposition or by dehydrogenation of vegetable compounds or animal compounds or hydrocarbons, various petroleum cuts, vegetable hydrocarbons such as vegetable oils, etc . . . . The carbon source generally contains hydrogen and one of its characteristics is its H/C atomic ratio. Preferably, a carbon source with an H/C ratio of less than 2, more preferably an H/C ratio of less than 1.7, and still more preferably an H/C ratio of less than 1.4 is used.

The normally amorphous or low crystallinity porous mineral matrix is generally selected from the group formed by alumina, silica, silica-alumina, or a mixture of at least two of the oxides cited above. Preferably, matrices containing alumina are used, in all of its forms which are known to the skilled person, for example gamma alumina.

The catalyst can also comprise at least one compound selected from the group formed by molecular sieves of the crystalline aluminosilicate type or natural or synthetic zeolites such as Y, X, L zeolite, beta zeolite, mordenite, omega zeolites, NU-10, TON, ZSM-22, ZSM-5.

The first step of the sulphurisation process of the invention consists of producing a mixture of the source of elemental sulphur and the carbon source and a powder containing the compound or compounds comprising at least one element selected from group IIIB, including the lanthanides and actinides, group IVB and group VB, the porous matrix and optionally at least one group VIB metal and optionally at least one group VIII element, optionally carbon, optionally at least one element selected from P, B and Si, and optionally at least one anion from group VIIA. This first step can be accomplished in several stages.

The matrix can first be formed and calcined before introduction into the mixture. Forming can be by extrusion, pelletisation, the oil-drop method, rotating plate granulation or any other method which is known to the skilled person. The pre-formed matrix is optionally calcined in air, usually at a temperature of at least 100° C., routinely at about 200° C. to 1000° C.

The matrix can be pre-impregnated with the transition metal or rare earth salt, or a salt containing the element selected from P, B and Si or an anion from group VIIA. For example, molybdenum impregnation can be facilitated by introducing phosphoric acid into the solutions which enables phosphorous to be introduced as well to improve the catalytic activity. Other phosphorous compounds can be used, as is well known to the skilled person.

The matrix is preferably impregnated using the "dry" impregnating method which is well known to the skilled person.

Impregnation can be carried out in a single step using a solution containing all of the constituent elements of the final catalyst.

The elements selected from group IIIB, including the lanthanides and actinides, group IVB, group VB, optional group VIB, and optional group VIII, and the element (or elements) selected from the group formed by P, B and Si, and the element (or elements) selected from group VIIA anions, can be introduced by one or more ion exchange operations carried out on the selected matrix, using a solution containing at least one precursor of the transition or rare earth metal.

When the metal or metals is/are introduced in a plurality of steps for impregnating the corresponding precursor salts, an intermediate step for drying the catalyst must be carried out at a temperature in the range 60° C. to 250° C.

The mixture of powders containing all or part of the ingredients can be formed, for example by extrusion, pelletisation, the oil drop method, rotating plate granulation or any other method which is well known to the skilled person.

The second step consists of reacting the mixture formed in the first step to obtain the sulphurised compound. A first method for carrying out the reaction consists of heating the mixture of powders to a temperature in the range 40° C. to 1000° C., preferably in the range 60° C. to 700° C. under the pressure of the reducing gas. Preferably, a steel autoclave which is resistant to corrosion by the sulphur compounds is used. The duration of heating the reaction mixture required for sulphurisation depends on the composition of the reaction mixture and on the reaction temperature.

The sulphide catalysts obtained in the present invention are used as catalysts for hydrogenation, hydrodenitrogenation, hydrodeoxygenation, of feeds containing at least one aromatic and/or olefinic and/or naphthenic and/or paraffinic compound, said feeds optionally containing metals and/or nitrogen and/or oxygen and/or sulphur. In these applications, the catalysts obtained by the present invention have an improved activity over the prior art.

The feeds used are gasolines, gas oils, vacuum gas oils, deasphalted or non deasphalted residues, paraffin oils, waxes and paraffins. They may contain heteroatoms such as sulphur, oxygen and nitrogen, and metals. The reaction temperature is in general over 200° C. and usually in the range 280° C. to 480° C. The pressure is over 0.1 MPa and in general over 5 MPa. The hydrogen recycle ratio is a minimum of 80, usually in the range 200 to 4000 liters of hydrogen per liter of feed. The hourly space velocity is generally in the range 0.1 to 20 $h^{-1}$.

The refiner is interested in the hydrodesulphurisation activity (HDS), hydrodenitrogenation activity (HDN) and the conversion. Fixed objectives have to be achieved under conditions which are compatible with economic reality. Thus the refiner seeks to reduce the temperature, the pressure, and the hydrogen recycle ratio and to maximise the hourly space velocity. The activity is known to be increased by increasing the temperature, but this is often to the detriment of catalyst stability. The stability or service life increases with increased pressure or hydrogen recycle ratio, but this is to the detriment of the economics of the process.

The following examples illustrate the invention without in any way limiting its scope.

EXAMPLE 1

Preparation of an Alumina Support used in the Catalyst Composition

An alumina based support was produced to enable the catalysts described below to be prepared from the formed support. To this end, a matrix composed of ultrafine tabular boehmite or alumina gel sold by Condea Chemie GmbH under the trade name SB3 was used. This gel was mixed with an aqueous solution containing 66% nitric acid (7% by weight of acid per gram of dry gel), then mixed for 15 minutes. After mixing, the paste obtained was passed through a die with cylindrical orifices with a diameter of 1.3 mm. The extrudates were then dried overnight at 120° C. and calcined at 550° C. for 2 hours in moist air containing 7.5% by volume of water. Cylindrical extrudates 1.2 mm in diameter were obtained which had a specific surface area of 243 $m^2/g$, a pore volume of 0.61 $cm^3/g$ and a monomodal pore distribution centred on 10 nm. X ray diffraction analysis of the matrix revealed that it was uniquely composed of low crystallinity cubic gamma alumina.

EXAMPLE 2

Preparation of a Nb/alumina Hydrotreatment Catalyst

Niobium was added to the extruded alumina support of Example 1 by dry impregnation of a solution of niobium pentoxide $Nb(OEt)_5$ in ethanol. After dry impregnation, the extrudates were dried overnight at 80° C. The Nb/alumina catalyst obtained had a final diniobium pentoxide content of 13.1% by weight.

EXAMPLE 3

Preparation of a CoNb/alumina Hydrotreatment Catalyst

Cobalt was added to the Nb/alumina catalyst of Example 2 by dry impregnation using a solution of cobalt nitrate $Co(NO_3)_2.6H_2O$ so as to obtain a final cobalt oxide CoO content of 2.9% by weight.

After dry impregnation, the extrudates were dried overnight at 80° C. The CoNb/alumina catalyst obtained contained 12.7% by weight of $Nb_2O_5$ and 2.8% by weight of CoO.

EXAMPLE 4

Preparation of a Ce/alumina Hydrotreatment Catalyst

Cerium was added to the extruded alumina support of Example 1 by dry impregnation using a solution of cerium nitrate $Ce(NO_3)_4.xH_2O$. After dry impregnation, the extrudates were dried overnight at 80° C. and calcined at 350° C. for 2 hours in dry air. The Ce/alumina catalyst obtained had a final $CeO_2$ content of 5.1% by weight.

EXAMPLE 5

Preparation of a CoCe/alumina Hydrotreatment Catalyst

The catalyst of Example 4 was dry impregnated using an aqueous cobalt nitrate $Co(NO_3)_2.6H_2O$ solution. After ageing at room temperature in a water-saturated atmosphere, the impregnated extrudates were dried overnight at 80° C. then calcined at 350° C. for 2 hours in dry air. The final cerium oxide content was 14.5% by weight. The final cobalt oxide CoO content was 2.0% by weight.

EXAMPLE 6

Catalyst Sulphurisation Ti (in Accordance with the Invention)

50 g of freshly calcined catalyst was introduced into an autoclave and a quantity of powdered elemental sulphur (sublimed sulphur from AUROS, ref. 201254) was added which corresponded to 120% of the theoretical stoichiometry of the reaction based on the formation of CoS, $NbS_2$, and $Ce_2S_4$ from CoO, $Nb_2O_5$, and $CeO_2$ respectively depending on the type of catalyst of Examples 2 to The autoclave was then purged with argon and the argon stream was then replaced with a stream of nitric oxide NO at a pressure of 1 atmosphere. The autoclave was then sealed and heated to 400° C. for 10 hours. After cooling, the autoclave was depressurised by pumping out the gases it contained, the autoclave was re-sealed and transferred to a glove box in an inert atmosphere to protect the product of the oxidation reaction from oxygen in the air. After opening, the black extrudates were recovered and preserved under inert gas in a sealed ampoule.

The quantities of elemental sulphur and powdered carbon used for sulphurisation T1 of 50 g of each catalyst of Examples 2 to 5 are shown in Table 1. The quantities of fixed sulphur and the quantities of residual carbon on the sulphurised catalysts are also shown in Table 1. This table shows that sulphurisation method T1 can produce a highly satisfactory degree of sulphurisation of the group VB metal, niobium, and of the lanthanide group metal, cerium, when these were supported on alumina.

TABLE 1

| Catalyst | Quantity of sulphur (g/50 g cat) | S content after sulphurisation (wt %) | C content after sulphurisation (wt %) | Degree of sulphurisation (%) |
|---|---|---|---|---|
| Nb | 3.78 | 4.90 | <0.05 | 83 |
| CoNb | 4.39 | 6.2 | <0.05 | 92 |
| Ce | 1.14 | 1.50 | <0.05 | 81 |
| CoCe | 1.63 | 2.19 | <0.05 | 86 |

EXAMPLE 7

Catalyst Sulphurisation T2 (not in Accordance with the Invention)

50 g of freshly calcined catalyst was introduced into a fixed bed catalyst flushed with a gas stream containing 15% by volume of $H_2S$ in hydrogen at atmospheric pressure. For every 50 g of solid, 2 litres per hour of gaseous mixture were passed and the catalyst was heated to a temperature of 400° C. for 10 hours. This sulphurisation, T2, is routinely used in the laboratory and still sometimes used industrially.

The quantities of fixed sulphur and residual carbon on the catalysts from Examples 2 to 5 sulphurised using this second method S2 are shown in Table 2. This table shows that sulphurisation method S2 could only produce low degrees of sulphurisation for catalysts containing the group VB metal, niobium, or the lanthanide group metal, cerium, when supported on alumina.

TABLE 2

| Catalyst | S content after sulphurisation (wt %) | C content after sulphurisation (wt %) | Degree of sulphurisation (%) |
|---|---|---|---|
| Nb | 0.85 | <0.05 | 14 |
| CoNb | 1.06 | <0.05 | 16 |
| Ce | 0.2 | <0.05 | 10 |
| CoCe | 0.70 | <0.05 | 26 |

EXAMPLE 8

Catalyst Sulphurisation T3 (in Accordance with the Invention)

50 g of freshly calcined catalyst was impregnated with 23 ml of a suspension of elemental sulphur in toluene, said solution containing the quantity of elemental sulphur (sublimed sulphur from AUROS, ref. 201254) corresponding to 120% of the theoretical stoichiometry of the reaction based on the formation of CoS, $NbS_2$ and $Ce_2S_4$ from CoO, $Nb_2O_5$ and $CeO_2$ respectively depending on the type of catalyst from Examples 2, to 5. The impregnated catalyst was poured into the autoclave and it was purged under low vacuum. Carbon monoxide was then injected at a pressure of one atmosphere, taking appropriate safety precautions.

The autoclave was then sealed and heated to 400° C. for 10 hours. After cooling, the autoclave was depressurised by pumping out the gases it contained, the autoclave was re-sealed and transferred to a glove box in an inert atmosphere to protect the product of the oxidation reaction from oxygen in the air. After opening, the black extrudates were recovered and preserved under inert gas in a sealed ampoule. This sulphurisation was termed T3.

The quantities of elemental sulphur used for sulphurisation T3 of 50 g of each catalyst of Examples 2 to 5 are shown in Table 3. The quantities of fixed sulphur and the quantities of residual carbon on the sulphurised catalysts are also shown in Table 3. This table shows that the sulphurisation method T3 can produce a highly satisfactory degree of sulphurisation of the group VB metal, niobium, and a medium degree of sulphurisation for the catalyst of Example 5 containing the lanthanide group metal, cerium. It should also be noted that the use of CO, toluene, led to a higher quantity of carbon in the sulphurised catalysts.

TABLE 3

| Catalyst | Quantity of sulphur (g/50 g cat) | S content after sulphurisation (wt %) | C content after sulphurisation (wt %) | Degree of sulphurisation (%) |
|---|---|---|---|---|
| Nb | 3.78 | 5.5 | 2.7 | 93 |
| CoNb | 4.39 | 6.03 | 1.5 | 88 |
| Ce | 1.14 | 1.05 | 3.2 | 56 |
| CoCe | 1.63 | 1.63 | 3.7 | 62 |

EXAMPLE 9

Catalyst Gas Oil HDS Test

The catalysts of Examples 2 to 5, sulphurised using the three methods T1, T2 and T3 of Examples 6, 7 and 8, were compared in a gas oil hydrodesulphurisation test.

The principal characteristics of the gas oil are shown in the following table:

| | |
|---|---|
| Density at 15° C. | 0.856 |
| Refractive index at 20° C. | 1.4564 |
| Viscosity at 50° C. | 3.72 cSt |
| Sulphur | 1.57% by weight |
| Simulated distillation | |
| IP | 153° C. |
| 5% | 222° C. |
| 50% | 315° C. |
| 95% | 415° C. |
| EP | 448° C. |

The gas oil HDS test was carried out under the following operating conditions:

| | |
|---|---|
| Total pressure | 3 MPa |
| Catalyst volume | 40 cm³ |
| Temperature | 340° C. |
| Hydrogen flow rate | 20 l/h |
| Feed flow rate | 80 cm³/h |

For these tests, the catalysts which had been sulphurised using methods T1, T2 and T3 were charged into the catalytic reactor then wetted by the feed at a temperature of 150° C. The temperature of the unit was then raised to 340° C.

A reference test was carried out for each catalyst by charging the catalyst into the catalytic test unit and carrying out a sulphurisation step by passing the test feed defined above, to which 2% by weight of dimethyldisulphide (DMDS) had been added, under the test conditions shown in the above Table, except that the temperature was 350° C., said temperature being maintained for 10 hours. After this step, the temperature was reduced to the test temperature, 340° C., and pure feed was injected. This sulphurisation method was termed T0.

The catalytic performances of the tested catalysts are shown in Table 4. They are expressed as the activity, with an order of 1.5. The relationship connecting activity and conversion (%HDS) is as follows:

Activity=$[100/(100-\%HDS)]^{0.5}-1$

To compare the activities of Nb catalysts, in Table 4, the activity of the monometallic Nb/alumina catalyst sulphurised by method T0 was assumed to be equal to 1.

TABLE 4

Activity of Nb/alumina catalysts for gas oil hydrodesulphurisation
Relative catalyst activity

| Sulphurisation | Nb | CoNb |
|---|---|---|
| T0 | 1 | 1.7 |
| T1 | 2.15 | 6.5 |
| T2 | 0.87 | 1.6 |
| T3 | 1.87 | 7.3 |

To compare the activities of the Ce catalysts, in Table 5, the activity of the monometallic Ce/alumina catalyst sulphurised by the T0 method was assumed to be equal to 1.

TABLE 5

Activity of Ce/alumina catalysts for gas oil hydrodesulphurisation
Relative catalyst activity

| Sulphurisation | Ce | CoCe |
|---|---|---|
| T0 | 1 | 1.46 |
| T1 | 1.35 | 3.21 |
| T2 | 1.09 | 1.13 |
| T3 | 2.17 | 3.39 |

It can be seen from Tables 4 and 5 that sulphurisation with elemental sulphur in a nitric oxide atmosphere or in a CO atmosphere resulted in better activity than for catalysts sulphurised by the mixture of gas oil and DMDS (T0) or sulphurised by $H_2S$ in the gas phase (T2). This effect could be due to a better dispersion of the sulphide phase formed because of the presence, from the start of sulphurisation, of the reducing gas which acts as a mild reducing agent compared with the hydrogen usually used, as in sulphurisation methods T0 and T2. The sulphurisation process of the present invention can thus produce sulphurised catalysts with improved catalytic properties. It can also be seen that the performances of the metallic catalysts are improved by the presence of the group VIII element. The sulphurisation method of the invention can thus also produce multimetallic sulphide phases supported on alumina with improved catalytic properties.

I claim:

1. A process for sulphurising a supported catalyst containing at least one element selected from group IIIB, including the lanthanides and actinides, group IVB, and group VB, optionally P, B or S: optionally a source of anions from group VIIA, and optionally at least one metal from groups VIB and VII, said process comprising contacting said supported catalyst with at least one source of a sulfur reactant consisting essentially of elemental sulphur in an atmosphere comprising at least one reducing gas, said reducing gas consisting essentially of a gas other than elemental hydrogen.

2. A process according to claim 1, in which the source of sulphur is elemental sulphur in the form of flowers of sulphur, sulphur in suspension in an aqueous medium or sulphur in suspension in an organic medium, and in which the reducing gas is at least one of carbon monoxide, nitric oxide, $N_2O$, methane, ethane, propane, butane, or ammonia used alone or as a mixture, diluted optionally by an inert gas.

3. A process according to claim 1, in which sulphurisation is carried out in the presence of a source carbon as a reactant.

4. A process according to claim 1, in which the catalyst further comprises at least one metal selected from groups VIB and VIII.

5. A process according to claim 1, in which the support is a porous matrix comprising at least one member selected from the group consisting of silica, alumina and silica-alumina.

6. A process according to claim 1, in which the catalyst also comprises at least one molecular sieve.

7. A process according to claim 1, in which the catalyst also comprises at least one element selected from the group formed by P, B and Si.

8. A process according to any one of claims 1 to 7, in which the catalyst also comprises at least one source of anions from group VIIA.

9. A process according to claim 1, comprising conducting the following steps:
   a) a reaction mixture is formed in one or more stages, which comprises a powder or mixture of powders containing at least one element selected from group IIIB, group IVB, and group VB, optionally at least one group VIII element, and optionally at least one group VIB element, and containing at least one porous matrix, optionally at least one zeolitic or non zeolitic molecular sieve, optionally at least one source of an element selected from the group formed by P, B and Si, optionally at least one source of anions from group VIIA, at least one source of elemental sulphur, optionally a source of carbon and optionally water;
   b) the reaction mixture obtained after step a) is maintained at a heating temperature of more than 40° C. at a pressure of over 0.01 MPa of at least one reducing gas other than hydrogen in a reactor.

10. A process according to claim 1, in which the reaction mixture is sulphurised at a temperature in the range 40° C. to 1000° C., preferably in the range 60° C. to 700° C., under the pressure of the reducing gas.

11. A process according to claim 1, conducted in a reaction zone comprising a closed vessel with a pressure exerted by the reducing gas and the gases produced by reduction and sulphurisation reactions.

12. A process according to claim 1, in which the reaction zone is in an open vessel.

13. A process according to claim 1, in which the catalyst is prepared ex-situ with respect to the use of said catalyst.

14. A process according to claim 1, in which the matrix is first impregnated, in one or more steps, with a salt of a transition metal or rare earth metal, optionally a salt of P, B or Si and optionally an anion from group VIIA, and in which an intermediate drying step is carried out on the catalyst at a temperature in the range 60° C. to 250° C. between each impregnation step.

15. Catalysts obtained using the process according to claim 1.

16. A catalyst according to claim 15 comprising, by weight with respect to the total catalyst weight:
   0.01% to 40% of at least one metal selected from elements from groups IIIB, IVB and VB;
   0.1% to 99% of at least one support comprising aporous matrix selected from the group consisting of silica, alumina and silica-alumina.

17. A process according to claim 4, in which the catalyst also comprises at least one element selected from the group formed by P, B and Si.

18. A process according to claim 17, in which the catalyst also comprises at least one source of anion from group VIIA.

19. A catalyst obtained by the process of claim 18.

20. A process according to claim 1, wherein the group VB element is niobium or thallium.

21. A catalyst produced in accordance with claim 20.

22. A process according to claim 1, wherein the entire reducing gas is other than hydrogen.

23. A catalyst produced in accordance with claim 22.

24. A process according to claim 1, wherein the entire sulfur reactant is elemental sulfur.

25. A process according to claim 22, wherein the entire sulfur reactant is elemental sulfur.

* * * * *

UNITED STATES PATENT AND TRADEMARK OFFICE
CERTIFICATE OF CORRECTION

PATENT NO. : 6,432,867 B1
DATED : August 13, 2002
INVENTOR(S) : Kasztelan et al.

It is certified that error appears in the above-identified patent and that said Letters Patent is hereby corrected as shown below:

<u>Column 11,</u>
Line 2, reads "VII" should read -- VIII --.

Signed and Sealed this

Seventh Day of September, 2004

JON W. DUDAS
*Director of the United States Patent and Trademark Office*